US009097319B2

(12) United States Patent
Eo et al.

(10) Patent No.: US 9,097,319 B2
(45) Date of Patent: Aug. 4, 2015

(54) AUTOMATED MANUAL TRANSMISSION FOR VEHICLE

(71) Applicant: Hyundai Motor Company, Seoul (KR)

(72) Inventors: Soon Ki Eo, Hwaseong-si (KR); Jong Yun Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/030,609

(22) Filed: Sep. 18, 2013

(65) Prior Publication Data
US 2014/0371022 A1 Dec. 18, 2014

(30) Foreign Application Priority Data

Jun. 14, 2013 (KR) .......................... 10-2013-0068170

(51) Int. Cl.
*F16H 3/44* (2006.01)

(52) U.S. Cl.
CPC .......... *F16H 3/44* (2013.01); *F16H 2200/0052* (2013.01); *F16H 2200/2043* (2013.01); *F16H 2200/2064* (2013.01); *F16H 2200/2094* (2013.01)

(58) Field of Classification Search
None
See application file for complete search history.

(56) References Cited

U.S. PATENT DOCUMENTS

| 4,523,493 A * | 6/1985 | Wei.beta. ........................ 475/205 |
| 6,093,974 A * | 7/2000 | Tabata et al. ................. 290/40 R |
| 7,364,527 B2 * | 4/2008 | Klemen ......................... 475/290 |
| 2003/0019313 A1 * | 1/2003 | Ibamoto et al. ................. 74/339 |
| 2006/0225527 A1 * | 10/2006 | Yang et al. ...................... 74/330 |
| 2010/0029433 A1 * | 2/2010 | Tenberge ....................... 475/219 |
| 2010/0044128 A1 * | 2/2010 | Oba et al. ................... 180/65.25 |
| 2010/0216584 A1 * | 8/2010 | Lutoslawski ...................... 475/5 |

FOREIGN PATENT DOCUMENTS

| JP | 58-109750 A | 6/1983 |
| JP | 8-233039 A | 9/1996 |
| KR | 10-2005-0100736 A | 10/2005 |
| KR | 10-1241167 B1 | 3/2013 |
| WO | WO 2012/123172 A1 | 9/2012 |

* cited by examiner

*Primary Examiner* — Justin Holmes
*Assistant Examiner* — David Morris
(74) *Attorney, Agent, or Firm* — Morgan, Lewis & Bockius LLP

(57) ABSTRACT

An automated manual transmission for a vehicle may include an input shaft configured to receive rotating force from a power source, an output shaft disposed parallel to the input shaft so that power is output from the output shaft, and a plurality of shift gear trains each comprising external gears respectively provided on the input shaft and the output shaft in such a way that the external gears circumscribe each other, the external gears forming a pair that embodies one of a series of shift ratios. Among the external gears that form a shift gear train in the plurality of the shift gear trains that embodies at least two adjacent shift ratios, either of two external gears that forms each of the shift gear trains may be connected to the input shaft or the output shaft by a planetary gear device.

10 Claims, 10 Drawing Sheets

AUTOMATED MANUAL TRANSMISSION FOR VEHICLE

CROSS REFERENCE TO RELATED APPLICATION

The present application claims priority of Korean Patent Application Number 10-2013-0068170 filed on Jun. 14, 2013, the entire contents of which application are incorporated herein for all purposes by this reference.

BACKGROUND OF INVENTION

1. Field of Invention

The present invention relates generally to transmissions for vehicles, and more particularly, to an automated manual transmission.

2. Description of Related Art

Automated manual transmissions can automatically shift gears using actuators during the driving of vehicles, thus providing convenience in the same manner as that of automatic transmissions. Moreover, such an automated manual transmission has superior power transmission efficiency to that of the typical automatic transmission, thereby contributing to improvement in fuel efficiency of a vehicle.

However, in the case of an automated manual transmission based on a synchromesh type of gear shifting mechanism, a moment at which transmission of power is interrupted occurs while shifting gears automatically using actuators. The interruption of power induces a reduction in torque, thus causing a phenomenon of deterioration of gear shift sensation like the vehicle being pulled rearwards.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made to solve at least some of the above problems occurring in the prior art. Various aspects of the present invention provide for an automated manual transmission for a vehicle which is configured such that it partially uses a mechanism of a conventional manual transmission in which power must be momentarily interrupted to shift gears and is able to effectively prevent a phenomenon of deterioration in torque transmitted to a drive wheel when shifting gears, thus preventing deterioration in a gear shift sensation and providing a smooth and reliable gear shift sensation, thereby enhancing marketability of the vehicle.

Various aspects of the present invention provide for an automated manual transmission for a vehicle, including: an input shaft configured to receive rotating force from a power source; an output shaft disposed parallel to the input shaft so that power is output from the output shaft; and a plurality of shift gear trains each comprising external gears respectively provided on the input shaft and the output shaft in such a way that the external gears circumscribe each other, the external gears forming a pair that embodies one of a series of shift ratios, wherein among the external gears that form a shift gear train of the shift gear trains that embodies at least two adjacent shift ratios, either of two external gears that forms each of the shift gear trains is connected to the input shaft or the output shaft by a planetary gear device.

In various other aspects, the present invention provides an automated manual transmission for a vehicle having a series of shift ratios of at least first through fourth gear stages that are gradually reduced in reduction ratios, the automated manual transmission including: a first planetary gear device provided with a sun gear integrally connected to an external gear that is rotatably provided on an output shaft among external gears that form the shift ratio of the first gear stage; a second planetary gear device provided with a sun gear integrally connected to an external gear that is rotatably provided on the output shaft among external gears that form the shift ratio of the second gear stage; a third planetary gear device provided with a carrier integrally connected to an external gear that is rotatably provided on the input shaft among external gears that form the shift ratio of the third gear stage; a fourth planetary gear device provided with a carrier integrally connected to an external gear that is rotatably provided on the input shaft among external gears that form the shift ratio of the fourth gear stage; brakes respectively controlling rotation of ring gears of the first through fourth planetary gear devices; and a controller controlling the brakes.

The methods and apparatuses of the present invention have other features and advantages which will be apparent from or are set forth in more detail in the accompanying drawings, which are incorporated herein, and the following DETAILED DESCRIPTION, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
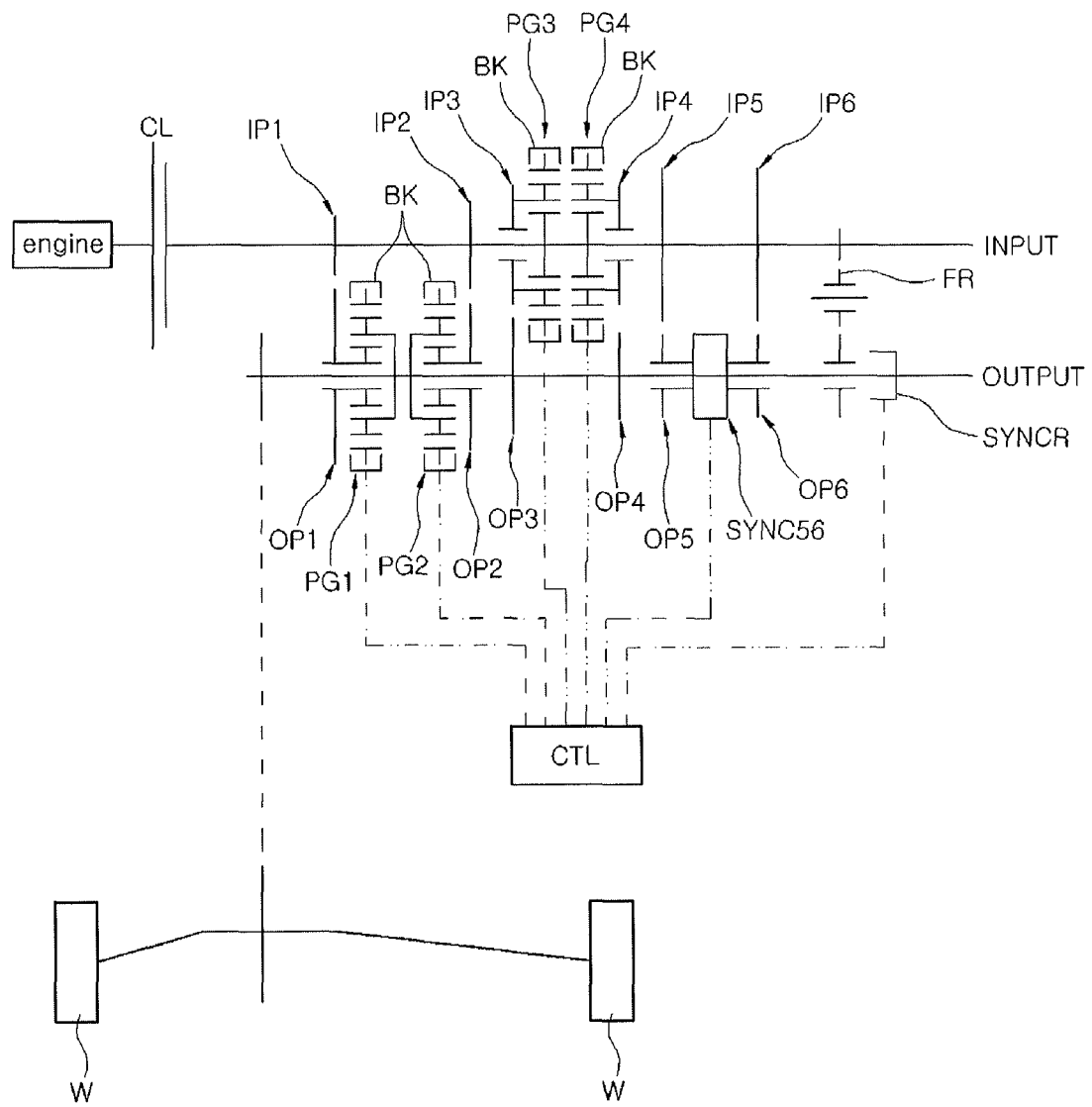
FIG. 1 is a view illustrating an automated manual transmission for vehicles, according to the present invention.

Referring to FIG. 1, an automated manual transmission for a vehicle according to the present invention includes: an input shaft INPUT which is configured to receive rotating force from a power source; an output shaft OUTPUT which is disposed parallel to the input shaft INPUT so that power is output from the output shaft; and a plurality of shift gear trains each of which includes external gears respectively provided on the input shaft INPUT and the output shaft OUTPUT in such a way that the external gears of the input and output shafts INPUT and OUTPUT circumscribe each other, the external gears forming a pair that embodies one of a series of shift ratios. Among the external gears that form a shift gear train of the shift gear trains that embodies at least two adjacent shift ratios, either of two external gears that forms each shift gear train is connected to the input shaft INPUT or the output shaft OUTPUT by a planetary gear device.

The transmission of the present invention basically has a conventional synchromesh manual transmission mechanism and is configured such that the shift gear trains that form gear stages are embodied by external gears that continuously engage with each other and form a pair. Furthermore, the transmission of the present invention is configured such that, among the external gears that form the shift gear trains that embody adjacent gear stages, either of two external gears that form each shift gear train is connected to the input shaft INPUT or the output shaft OUTPUT by the planetary gear device, and gears are shifted by controlling a rotating element of the planetary gear device.

The external gear that is connected to the input shaft INPUT or the output shaft OUTPUT by the planetary gear device is integrally connected to one rotating element of the planetary gear device with restriction in rotation relative to each other.

The planetary gear device includes three rotating elements. One of two rotating elements, other than the rotating element connected to the external gear, is integrally connected to the input shaft INPUT or the output shaft OUTPUT with restriction in rotation relative to each other, while the other rotating element is connected to a brake such that its own rotation can be restricted.

The brake is configured such that frictional force applied to the rotating element is gradually increased or decreased by a controller. Therefore, as the controller controls the brake and the frictional force thereof varies, the rotating element of the planetary gear device that is connected to the brake continuously goes from a state capable of rotating without restriction, to state of being gradually restricted in rotation, to state of being stopped. Here, the brake can be embodied by various known techniques such as a typical hydraulic multiple disc clutch or a band brake.

In various embodiments, the planetary gear device comprises a single pinion simple planetary gear device which has three rotating elements includes a sun gear, a carrier and a ring. In the case where the planetary gear device is coaxially installed on the input shaft INPUT, the carrier is integrally connected to the external gear. In the case where the planetary gear device is coaxially installed on the output shaft OUTPUT, the sun gear is integrally connected to the external gear.

To form a gear stage, either of two external gears forming the corresponding shift gear train is provided on the input shaft INPUT, and the other external gear is provided on the output shaft OUTPUT. Any one of the two external gears, for example, the external gear that is provided on the input shaft INPUT is integrated with the input shaft INPUT, while the external gear that is provided on the output shaft OUTPUT is supported by a bearing or the like such that it can rotate relative to the output shaft OUTPUT. In this state, the external gear that is provided on the output shaft OUTPUT is connected to the output shaft OUTPUT through the planetary gear device. Here, it can be selected to determine which one of the external gears that are respectively provided on the input shaft INPUT and the output shaft OUTPUT is rotatably installed on the corresponding shaft and is connected to the shaft by the planetary gear device.

It may be a simple matter of choice to determine which one of the two external gears of a shift gear train, that is, of two that are respectively installed on the input shaft INPUT and the output shaft OUTPUT, is fixed to the corresponding shaft and which one of them is rotatably connected to the corresponding shaft through the planetary gear device. However, with regard to a gear shift ratio which is embodied by each external gear and the size of the external gear, in the present invention, of the external gears used to embody a low gear stage which forms a comparatively large reduction ratio, the external gear that is provided on the output shaft OUTPUT is rotatably connected to the output shaft OUTPUT through the planetary gear device. Further, the external gear is directly connected to the sun gear of the planetary gear device. Therefore, despite the structure in which the diameter of the external gear that is provided on the output shaft OUTPUT is comparatively small, an appropriate reduction ratio can be formed by the planetary gear device, whereby a desired gear shift ratio can be obtained. Consequently, the reduction in diameter of the external gear makes it possible to reduce the weight and volume of the transmission.

Due to the above-mentioned reason, in various embodiments such as that illustrated in FIG. 1, the external gear of each of first and second gear stages is connected to the output shaft OUTPUT through the planetary gear device.

The external gears that form third and fourth gear stages are provided on the input shaft INPUT through the corresponding planetary gear devices. Although these gear stages may also be configured such that the planetary gear devices are disposed on the output shaft OUTPUT, because the planetary gear devices of the first and second gear stages are installed on the output shaft OUTPUT, the planetary gear devices of the third and fourth gear stages may be installed on the input shaft INPUT for the reasons of arrangement balance or the like. In this case, the external gear of the input shaft INPUT is connected to the carrier of the planetary gear device. The sun gear of the corresponding planetary gear device is directly connected to the input shaft INPUT. Thus, because rotating force is transmitted to the external gear of the input shaft INPUT after it has been reduced in speed, for example, compared to the construction in which the external gear is connected to the sun gear so that power is transmitted from the carrier to the external gear after it has been increased in speed, a reduction gear ratio that the external gear train forming the gear stage must handle is reduced. Ultimately, the diameter of the external gear provided on the output shaft OUTPUT can be reduced.

The planetary gear device is connected to one of the external gears of the shift gear train that forms a low shift ratio that has a comparatively high reduction ratio among a series of shift ratios that are formed by the shift gear trains. One of the external gears of the shift gear train that forms a high shift ratio that has a comparatively low reduction ratio among a series of shift ratios that are formed by the shift gear trains is connected to the input shaft INPUT or the output shaft OUTPUT through a synchronizer.

That is, as shown in FIG. 1, given the fact that the present invention basically has the conventional synchromesh manual transmission mechanism, the first through four gear stages are formed by the planetary gear devices, and the fifth and sixth gear stages are formed by the conventional synchronizer. The reverse gear stage is also formed by the conventional synchronizer.

The reason, why the planetary gear devices are used in the shift gear trains that form low gear stages having relatively high reduction ratios and a synchronizer having the same structure as that of the conventional technique is used in the shift gear trains that form high gear stages having relatively low reduction ratios, is due to the fact that in the vehicle provided with the transmission embodying a series of gear stages, when gear shifting is conducted between low gear stages of low speeds, a sense of torque interruption which greatly affects the gear shift sensation occurs.

Of course, because the reverse gear stage is not continuous from other gear stages, even if the conventional synchronizer is used, deterioration of gear shift sensation is not caused.

Figure 7:
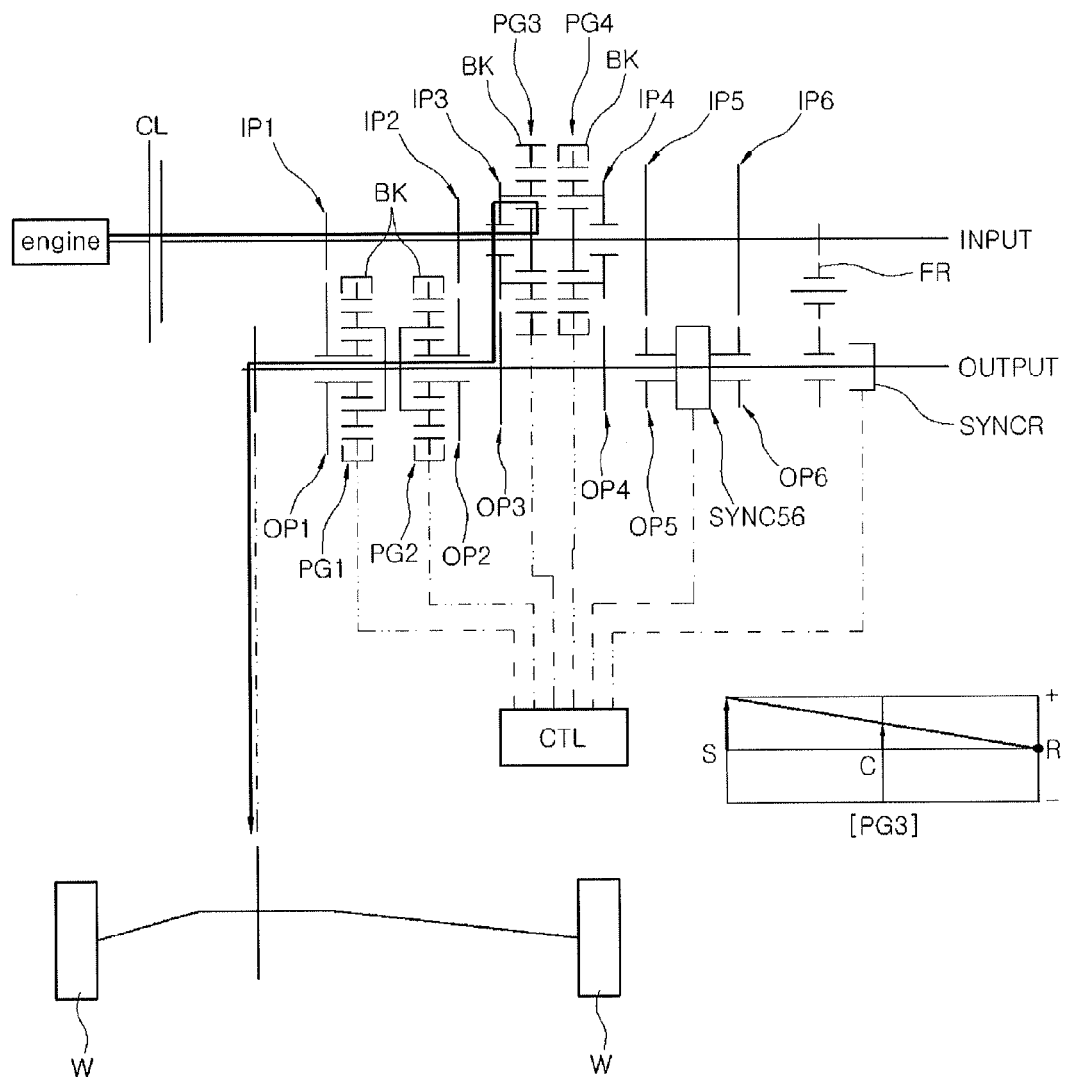
FIG. 7 is a view illustrating the transmission of FIG. 1 that has been shifted to third gear.
Figure 8:
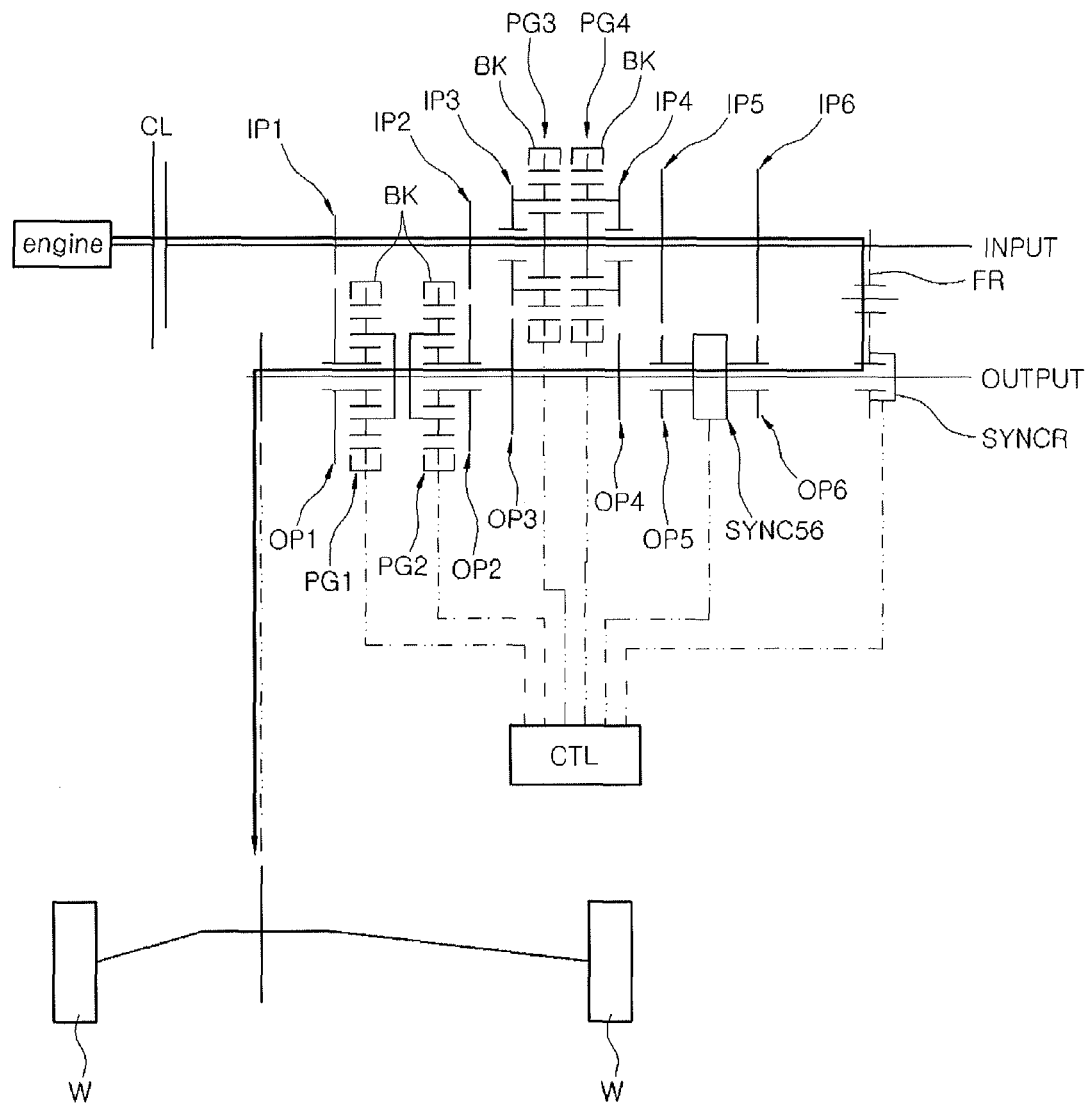
FIG. 8 is a view illustrating a state of the transmission of FIG. 1 that has been shifted to reverse gear.
Figure 9:
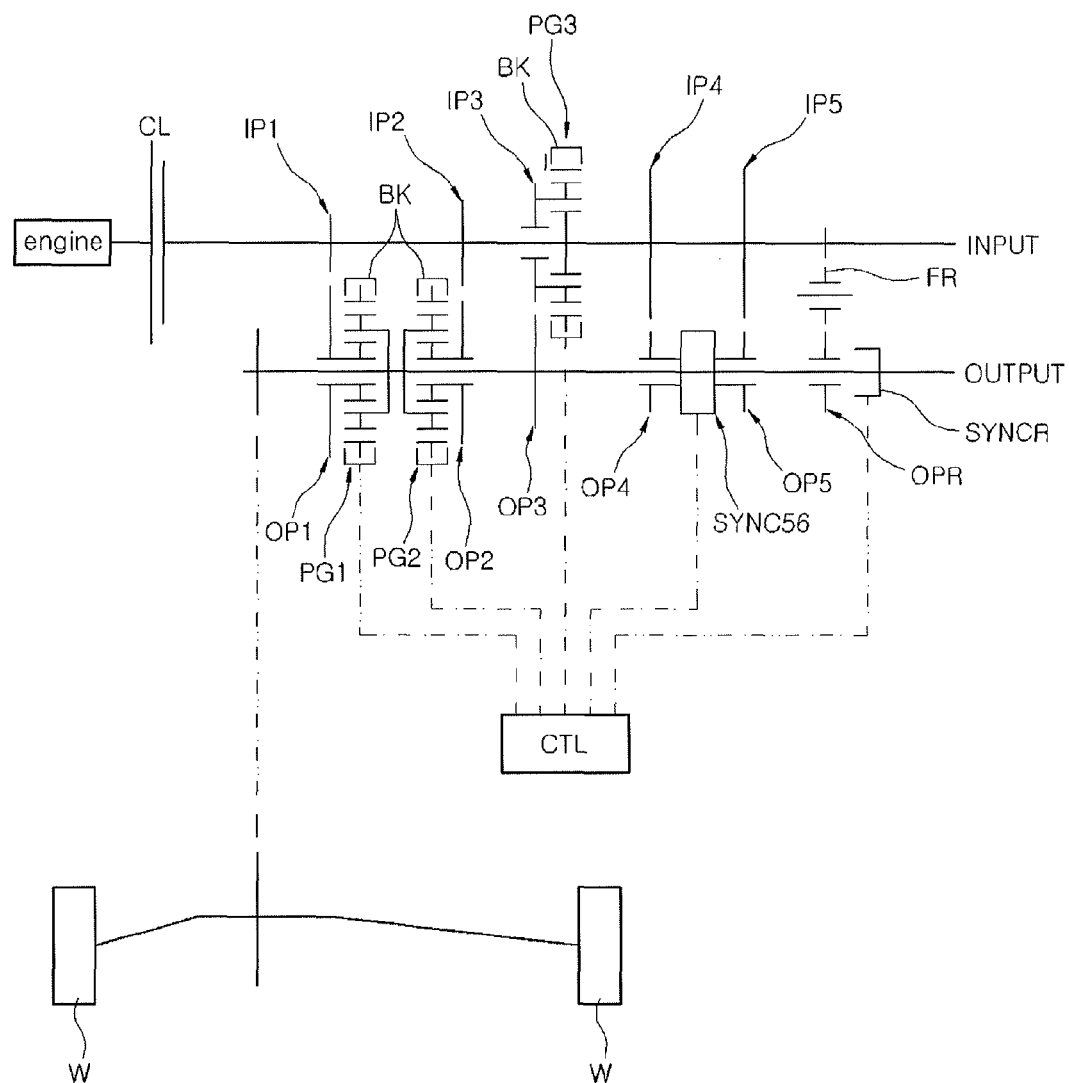
FIGS. 9 and 10 are views showing other embodiments of the present invention.
Figure 10:
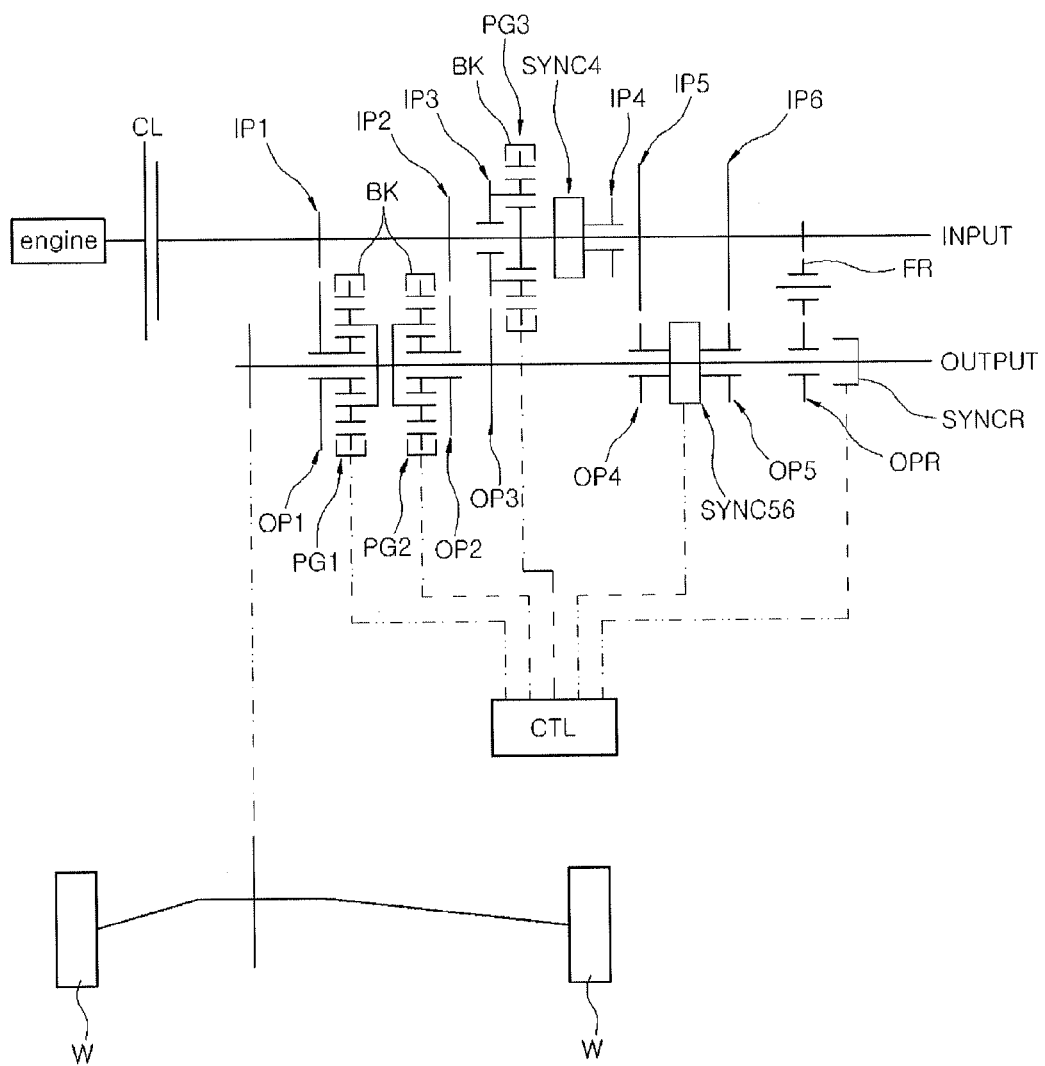

FIGS. 9 and 10 illustrate various modifications of the embodiments illustrated in FIGS. 1 through 8, based on the technical spirit of the present invention. An embodiment of FIG. 9 is a five-forward and one-reverse gear transmission which is configured such that the planetary gear devices are used to form the first through third gear stages while the fourth and fifth gear stages are embodied by the conventional synchronizer. An embodiment of FIG. 10 is a six-forward and one-reverse gear transmission in the same manner as that of FIG. 1, but unlike the embodiment of FIG. 1, only first through third gear stages are embodied by planetary gear devices while fourth through sixth gear stages are embodied by separate synchronizers.

As such, in the transmission having a plurality of gear stages according to present invention, at least some of the gear stages are embodied by the planetary gear devices, wherein, among a series of gear stages, a series of low gear stages that have high reduction ratios are embodied by the planetary gear devices while the other gear stages that have relatively low reduction ratios are embodied by the conventional synchronizers.

The embodiment of FIGS. 1 through 8 is the case where it is provided with four pairs of shift gear trains which form low shift ratios that are comparatively large in reduction ratio among a series of shift ratios formed by the shift gear trains. The planetary gear devices, which are respectively connected to the external gears of two shift gear trains that are relatively high in reduction ratio among the four pairs of shift gear trains, are coaxially provided on the output shaft OUTPUT. The planetary gear devices, which are respectively connected to the external gears of two shift gear trains that are relatively low in reduction ratio among the four pairs of shift gear trains, are coaxially provided on the input shaft INPUT.

That is, the transmission of FIG. 1 has a series of shift ratios of at least first through fourth gear stages which are gradually reduced in reduction ratios. The transmission includes: a first planetary gear device PG1, a sun gear of which is integrally connected to an external gear, which is rotatably provided on the output shaft OUTPUT, among the external gears that form the shift ratio of the first gear stage; a second planetary gear device PG2, a sun gear of which is integrally connected to an external gear, which is rotatably provided on the output shaft OUTPUT, among the external gears that form the shift ratio of the second gear stage; a third planetary gear device PG3, a carrier of which is integrally connected to an external gear, which is rotatably provided on the input shaft INPUT, among the external gears that form the shift ratio of the third gear stage; a fourth planetary gear device PG4, a carrier of which is integrally connected to an external gear, which is rotatably provided on the input shaft INPUT, among the external gears that form the shift ratio of the fourth gear stage; brakes BK which respectively control rotation of ring gears of the first through fourth planetary gear devices; and a controller CTL which controls the brakes BK.

Furthermore, a carrier of the first planetary gear device PG1 and a carrier of the second planetary gear device PG2 are integrally connected to the output shaft OUTPUT, and a sun gear of the third planetary gear device PG3 and a sun gear of the fourth planetary gear device PG4 are integrally connected to the input shaft INPUT.

In the case of the fifth or sixth gear stage that has a lower reduction gear ratio than that of the fourth gear stage, one of two external gears that constitute the shift gear train that forms each gear stage is integrally connected to the input shaft INPUT, and the other external gear is connected to the output shaft OUTPUT by a synchronizer SYNC56.

Meanwhile, a clutch CL which controls power transmitted from the power source is installed on the input shaft INPUT. In the case where the power source is an engine, the clutch CL is configured such that when the engine starts, the transmission of power between the input shaft INPUT and the power source is interrupted.

For reference, the shift gear train that forms the first gear stage includes an external gear IP1 and an external gear OP1. The shift gear train that forms the second gear stage includes an external gear IP2 and an external gear OP2. The shift gear train that forms the third gear stage includes an external gear IP3 and an external gear OP3. The shift gear train that forms the fourth gear stage includes an external gear IP4 and an external gear OP4. The shift gear train that forms the fifth gear stage includes an external gear IP5 and an external gear OP5. The shift gear train that forms the sixth gear stage includes an external gear IP6 and an external gear OP6.

Hereinafter, the operation of various embodiments of the present invention will be described with reference to FIGS. 1 through 8.

Figure 2:
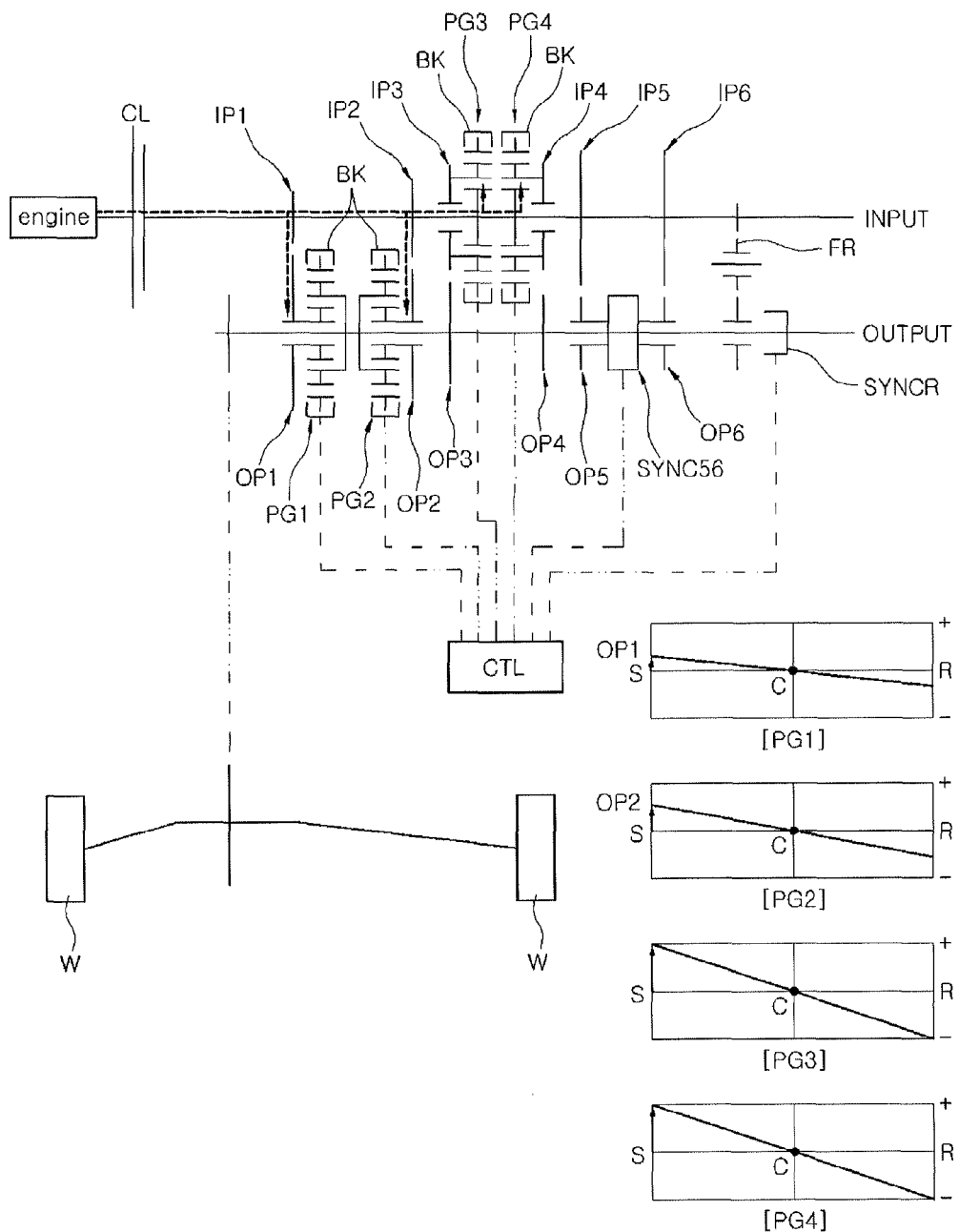
FIG. 2 illustrates an engaged state of a clutch after an engine starts of the transmission in FIG. 1.

In the state of FIG. 1, the engine starts while the clutch CL is in an unengaged state. As shown in FIG. 2, when the clutch CL enters an engaged state, power generated from the engine is supplied, through the input shaft INPUT, to the planetary gear device that form the gear stages. In this state, the brakes BK which control the ring gears of the planetary gear devices are in a released state, and a driver is stepping on a brake pedal, so that the output shaft OUTPUT is in the stopped state. Thus, the carriers of all of the planetary gear devices are in the stationary state, and the sun gears and the ring gears are rotated in opposite directions based on the carriers. Therefore, transmission of power is not conducted.

Of course, because the synchronizer SYNC56 does not select the fifth or sixth gear stage, neither the shift gear train of the fifth gear stage nor the sixth gear stage transmits power from the input shaft INPUT to the output shaft OUTPUT.

Figure 3:
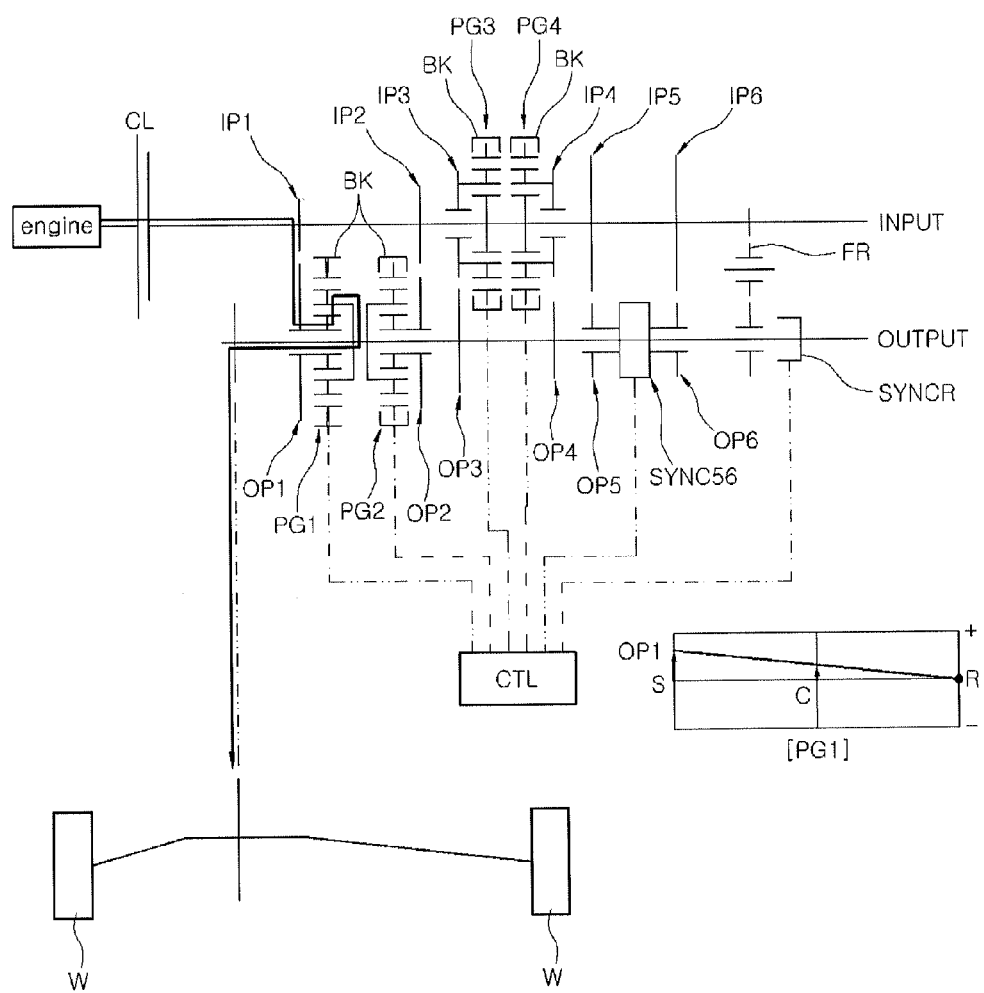
FIG. 3 is a view illustrating a state of the transmission of FIG. 1 when a vehicle starts in first gear.

FIG. 3 illustrates the state of the transmission when starting in first gear or is driving in first gear. In this state, the driver has released the brake pedal, and the controller CTL instructs the brake BK to catch the ring gear of the planetary gear device that forms the first gear stage, whereby power transmitted from the input shaft INPUT through the external gears IP1 and OP1 of the first gear stage is reduced in speed while successively passing through the sun gear and the carrier of the first planetary gear device PG1 and then is transmitted to the output shaft OUTPUT, thus embodying a shift ratio of the first gear stage. The other planetary gear devices and the synchronizer are not involved in the transmission of power.

Figure 4:
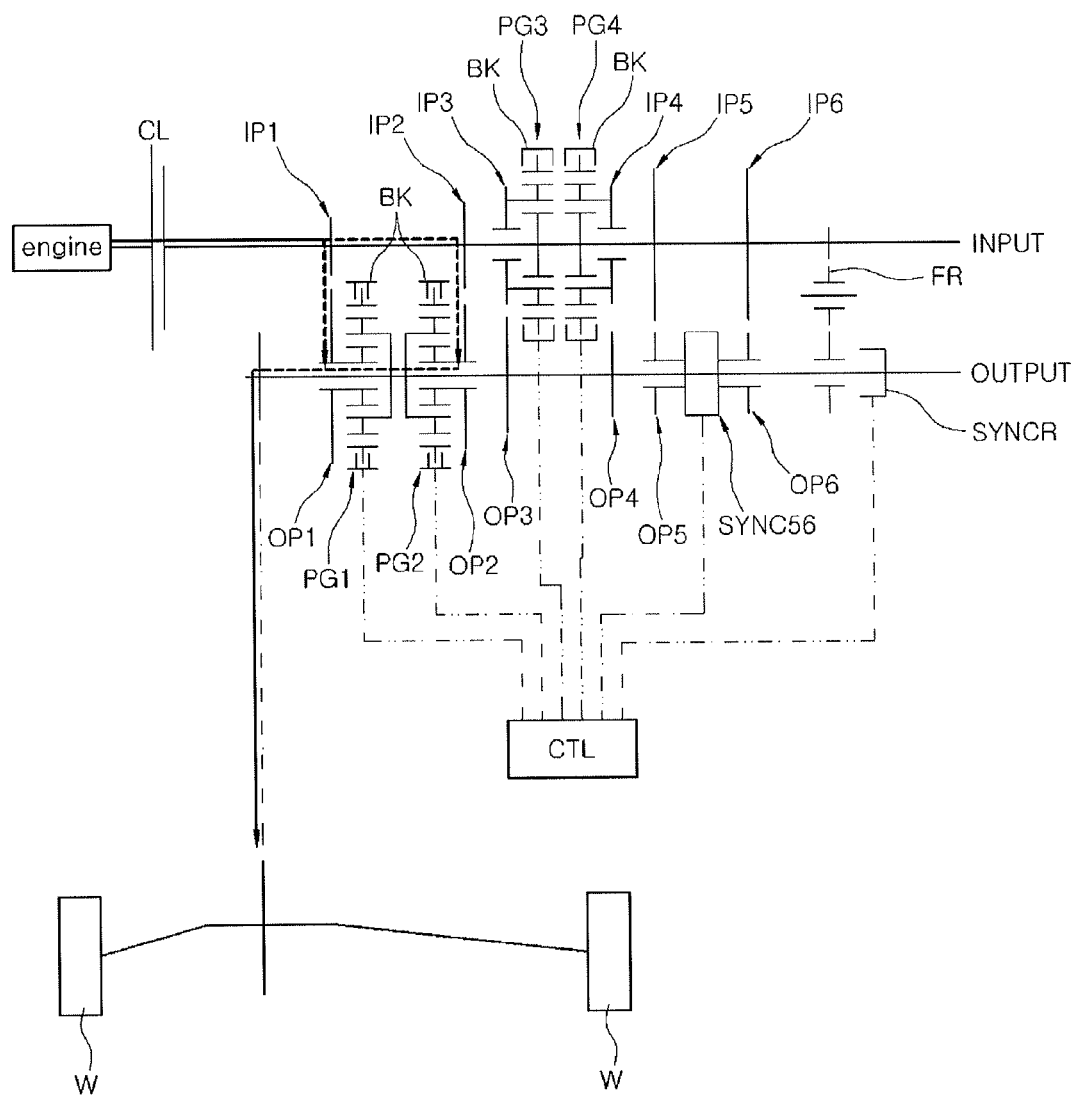
FIG. 4 illustrates a process of shifting from first gear to second gear of the transmission of FIG. 1.

FIG. 4 illustrates a process of shifting from first gear to second gear. The controller CTL releases the brake BK that has restricted the ring gear of the first planetary gear device PG1 of the first gear stage and simultaneously restricts the ring gear of the second planetary gear device PG2 of the second gear stage using the corresponding brake BK.

Here, of the ring gears of the two planetary gear devices, the ring gear of the first gear stage is gradually released while the ring gear of the second gear stage is gradually restricted. Such rotation states of the ring gears are precisely controlled by a slip control method. In this slip control section, power is transmitted from the input shaft INPUT to the output shaft OUTPUT through two paths at the same time so that a sense of torque interruption can be prevented from occurring, unlike the conventional technique. Compared to the conventional technique in which gears are shifted by successively controlling the synchronizer and the clutch, the amount of time it takes to shift gears can be reduced because only slip rates of the two ring gears are controlled in such a way that the two brakes BK are alternately operated.

Figure 5:
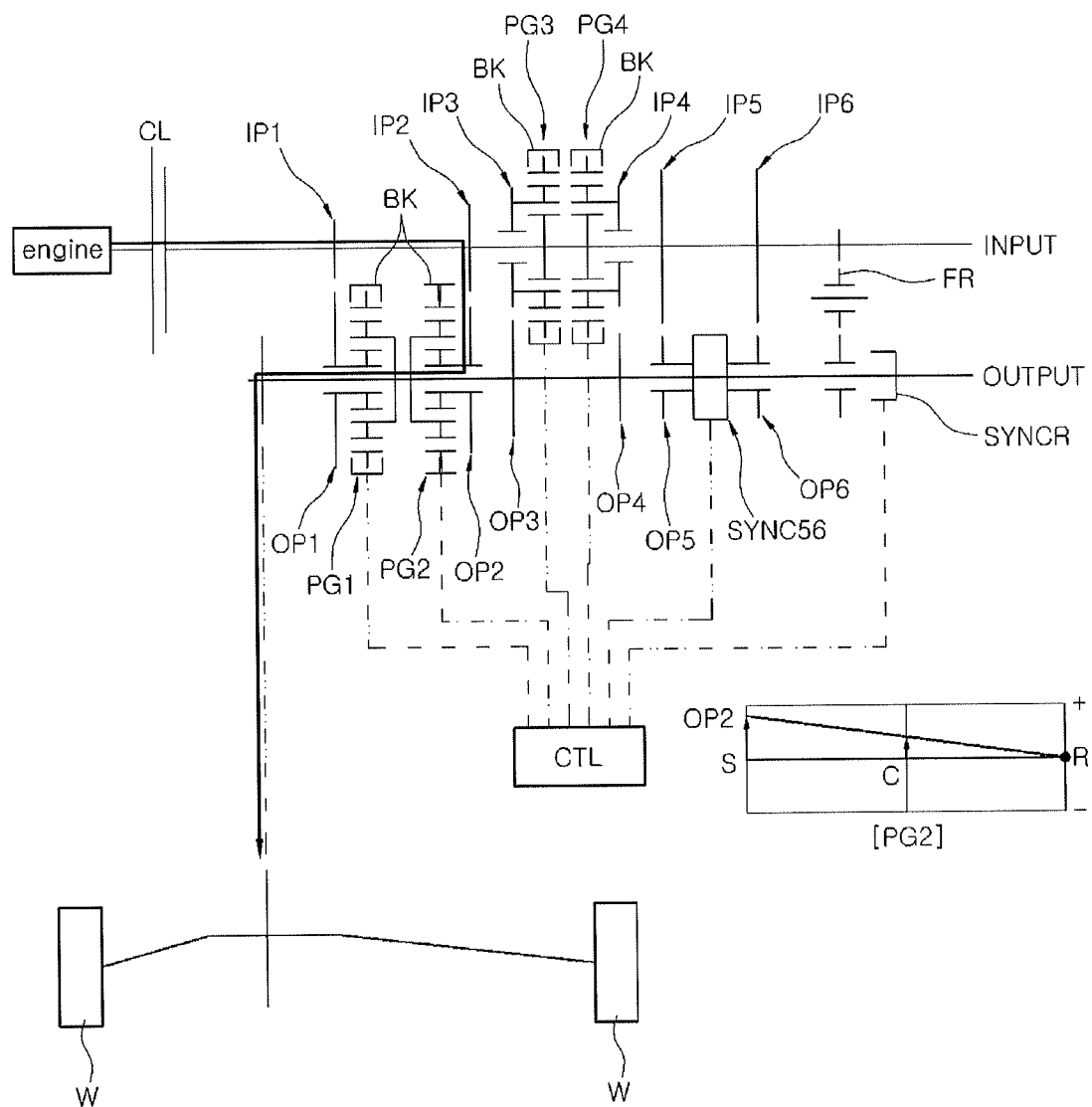
FIG. 5 is a view illustrating the transmission of FIG. 1 that has been shifted to second gear.

When shifting gears from first gear to second gear is completed, as shown in FIG. 5, the transmission enters a second-gear-stage driving state. In this state, the ring gear of the second planetary gear device PG2 of the second gear stage is fixed by the corresponding brake BK so that the rotating force supplied from the input shaft INPUT is reduced in speed via the sun gear and the carrier of the planetary gear device through the second-gear-stage external gears IP2 and OP2 before being transmitted to the output shaft OUTPUT.

Figure 6:
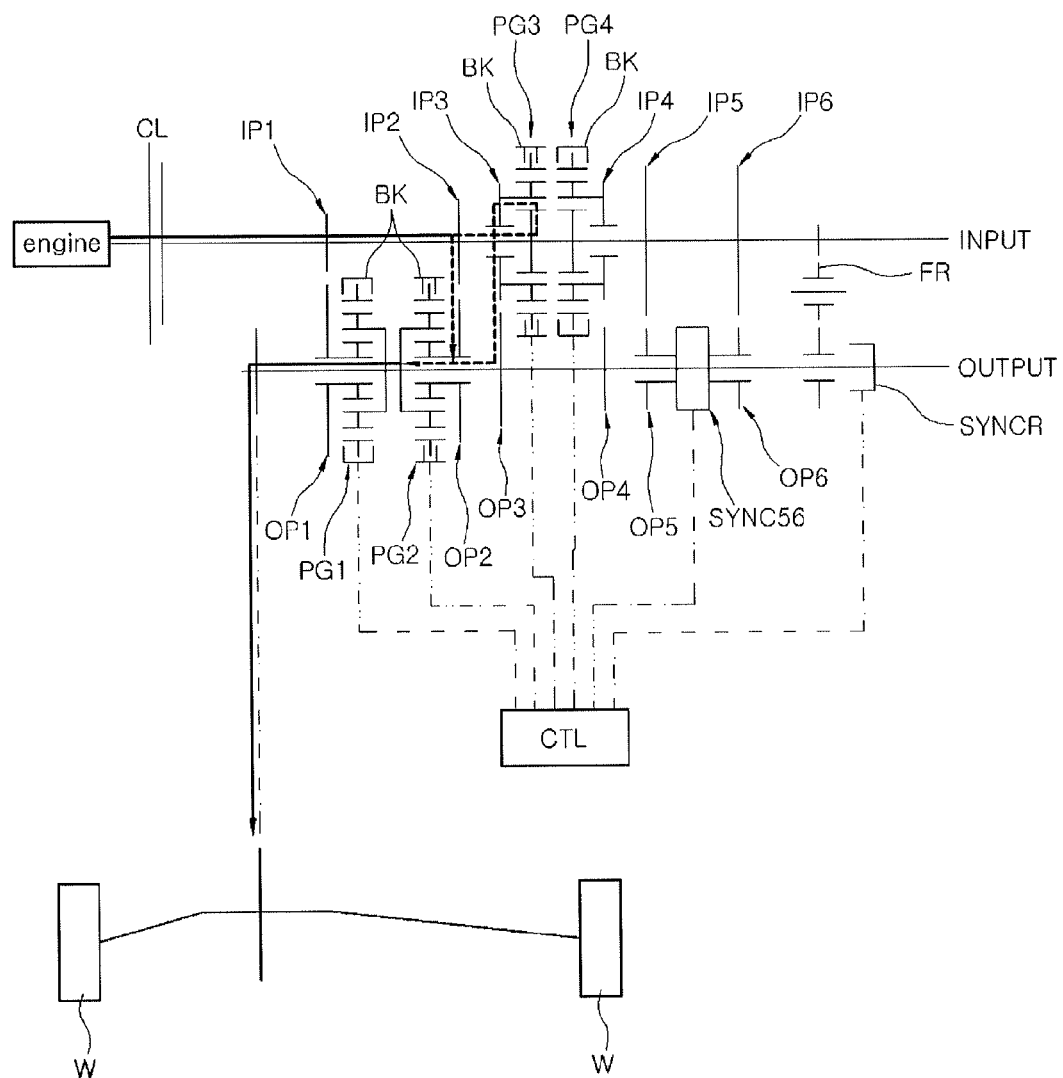
FIG. 6 illustrates a process of shifting from second gear to third gear of the transmission of FIG. 1.

The principle of gear shifting control not only between the second gear stage and the third gear stage but also between other gear stages is the same as that of the gear shifting control between the first gear stage and the second gear stage. FIG. 6 illustrates a process of shifting from second gear to third gear. The transmission is controlled in such a way that the ring gear of the second planetary gear device PG2 is released while the ring gear of the third planetary gear device PG3 is restricted. Then, power of the input shaft INPUT enters, for a while, the state in which the second planetary gear device PG2 and the third planetary gear device PG3 transmit power at the same time during slip operation of the ring gears of the planetary gear devices. Thereafter, as shown in FIG. 7, the transmission enters a state in which the power is transmitted to the output shaft OUTPUT only through the third planetary gear device PG3, thus forming the third gear stage.

Meanwhile, FIG. 8 is a view illustrating a state of the transmission in reverse gear. Rotating force that is reversed in direction by a reverse idle gear FR is transmitted to the output shaft OUTPUT through a reverse synchronizer SYNCR, thus embodying a reverse gear stage. This is similar to or the same as the conventional known technique.

As described above, an automated manual transmission for a vehicle according to the present invention is configured such that it partially uses mechanism of a conventional manual transmission in which power must be momentarily interrupted to shift gears and is able to effectively prevent a phenomenon of deterioration in torque transmitted to a drive wheel when shifting gears. Therefore, the present invention can prevent deterioration in gear shift sensation and provides smooth, reliable gear shift sensation, and facilitates gear shift manipulation and control, thereby enhancing marketability of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. An automated manual transmission for a vehicle, comprising:
   an input shaft configured to receive rotating force from a power source;
   an output shaft disposed parallel to the input shaft so that power is output from the output shaft; and
   a plurality of shift gear trains each comprising external gears respectively provided on the input shaft and the output shaft in such a way that the external gears circumscribe each other, the external gears forming a pair that embodies one of a series of shift ratios,
   wherein among the external gears that form a shift gear train in the plurality of the shift gear trains that embodies at least two adjacent shift ratios, either of two external gears that forms each of the shift gear trains is connected to the input shaft or the output shaft by a planetary gear device,
   wherein two external gears form one shift ratio, one of the two external gears is connected to the planetary gear device, and the other of the external gears is directly connected to either the input shaft or the output shaft, which is not equipped with the planetary gear device.

2. The automated manual transmission as set forth in claim 1, wherein the external gear that is connected to the input shaft or the output shaft by the planetary gear device is integrally connected to a rotating element of the planetary gear device with restriction in rotation relative to each other.

3. The automated manual transmission as set forth in claim 2, wherein the planetary gear device comprises three rotating elements,
   wherein one of two rotating elements, other than the rotating element connected to the corresponding external gear, is integrally connected to the input shaft or the output shaft with restriction in rotation relative to each other, while a remaining one of the two rotating elements is connected to a brake such that rotation thereof can be restricted, and the brake is configured such that frictional force applied to the remaining rotating element is gradually increased or decreased by a controller.

4. The automated manual transmission as set forth in claim 3, wherein the three rotating elements of the planetary gear device comprises a sun gear, a carrier and a ring gear,
   wherein when the planetary gear device is coaxially provided on the input shaft, the carrier is integrally connected to the corresponding external gear, or
   when the planetary gear device is coaxially provided on the output shaft, the sun gear is integrally connected to the corresponding external gear.

5. The automated manual transmission as set forth in claim 4, wherein the planetary gear device is connected to one of the external gears of the shift gear train that forms a low shift ratio that has a relatively high reduction ratio among the series of shift ratios that are formed by the plurality of the shift gear trains, and
   one of the external gears of the shift gear train that forms a high shift ratio that has a relatively low reduction ratio among the series of shift ratios that are formed by the plurality of the shift gear trains is connected to the input shaft or the output shaft through a synchronizer.

6. The automated manual transmission as set forth in claim 5, wherein shift gear trains that form low shift ratios having relatively high reduction ratios, among the series of shift ratios, comprise four pairs of the shift gear trains, first planetary gear devices that are respectively connected to the external gears of two shift gear trains that are relatively high in reduction ratio among the four pairs of the shift gear trains are coaxially provided on the output shaft, and second planetary gear devices that are respectively connected to the external gears of remaining two shift gear trains that are relatively low in reduction ratio of the four pairs of the shift gear trains are coaxially provided on the input shaft.

7. The automated manual transmission as set forth in claim 5, wherein a clutch is installed on the input shaft, the clutch controlling transmission of the power generated from the power source.

8. An automated manual transmission for a vehicle having a series of shift ratios of at least first through fourth gear stages that are gradually reduced in reduction ratios, the automated manual transmission comprising:

a first planetary gear device provided with a sun gear integrally connected to a first external gear that is rotatably provided on an output shaft among a first pair of external gears that form a shift ratio of a first gear stage;

a second planetary gear device provided with a sun gear integrally connected to a second external gear that is rotatably provided on the output shaft among a second pair of external gears that form a shift ratio a second gear stage;

a third planetary gear device provided with a carrier integrally connected to a third external gear that is rotatably provided on an input shaft among a third pair of external gears that form a shift ratio of a third gear stage;

a fourth planetary gear device provided with a carrier integrally connected to an external gear that is rotatably provided on the input shaft among external gears that form a shift ratio of a fourth gear stage;

brakes respectively controlling rotation of ring gears of the first through fourth planetary gear devices; and a controller controlling the brakes, wherein the input shaft and the output shaft are disposed each other in parallel, one of the external gears forming the shift ratio of the first gear stage is directly connected to the input shaft, one of the external gears forming the shift ratio of the second gear stage is directly connected to the input shaft, one of the external gears forming the shift ratio of the third gear stage is directly connected to the output shaft, and one of the external gears forming the shift ratio of the fourth gear stage is directly connected to the output shaft.

9. The automated manual transmission as set forth in claim 8, wherein a carrier of the first planetary gear device and a carrier of the second planetary gear device are integrally connected to the output shaft; and a sun gear of the third planetary gear device and a sun gear of the fourth planetary gear device are integrally connected to the input shaft.

10. The automated manual transmission as set forth in claim 9, further comprising:

at least one gear stage having a reduction ratio lower than the reduction ratio of the fourth gear stage, wherein one of two external gears that form the at least one gear stage is integrally connected to the input shaft, and a remaining one of the two external gears is connected to the output shaft by a synchronizer.

* * * * *